United States Patent [19]
Wyckoff et al.

[11] 3,997,176
[45] Dec. 14, 1976

[54] EXPANSIBLE MANDREL

[75] Inventors: James A. Wyckoff, Interlaken; William J. Miller, Ithaca, both of N.Y.

[73] Assignee: Borg-Warner Corporation, Chicago, Ill.

[22] Filed: Sept. 19, 1975

[21] Appl. No.: 614,999

[52] U.S. Cl. .............................................. 279/2 R
[51] Int. Cl.² ........................................ B23B 31/40
[58] Field of Search .......... 279/2 R, 2 A; 242/72.1; 82/44

[56] References Cited
UNITED STATES PATENTS

| | | | |
|---|---|---|---|
| 2,043,563 | 6/1936 | Tenny | 242/72.1 |
| 2,518,508 | 8/1950 | Van Bever | 279/2 X |
| 3,085,763 | 4/1963 | Floyd, Jr. | 279/2 X |
| 3,104,849 | 9/1963 | Bond | 242/72.1 |
| 3,300,157 | 3/1965 | Koreishi | 242/72.1 X |
| 3,552,673 | 1/1971 | Evers | 242/72.1 |

Primary Examiner—Gil Weidenfeld
Attorney, Agent, or Firm—Aubrey L. Burgess

[57] ABSTRACT

An expansible mandrel constructed to radially expand equally comprising a generally truncated polyhedron-shaped core member and a plurality of wedge members defining a cylinder, the core member being axially movable relative to the wedge members. Elastic means surrounding the wedge members maintain the wedge members in position relative to the core member.

5 Claims, 10 Drawing Figures

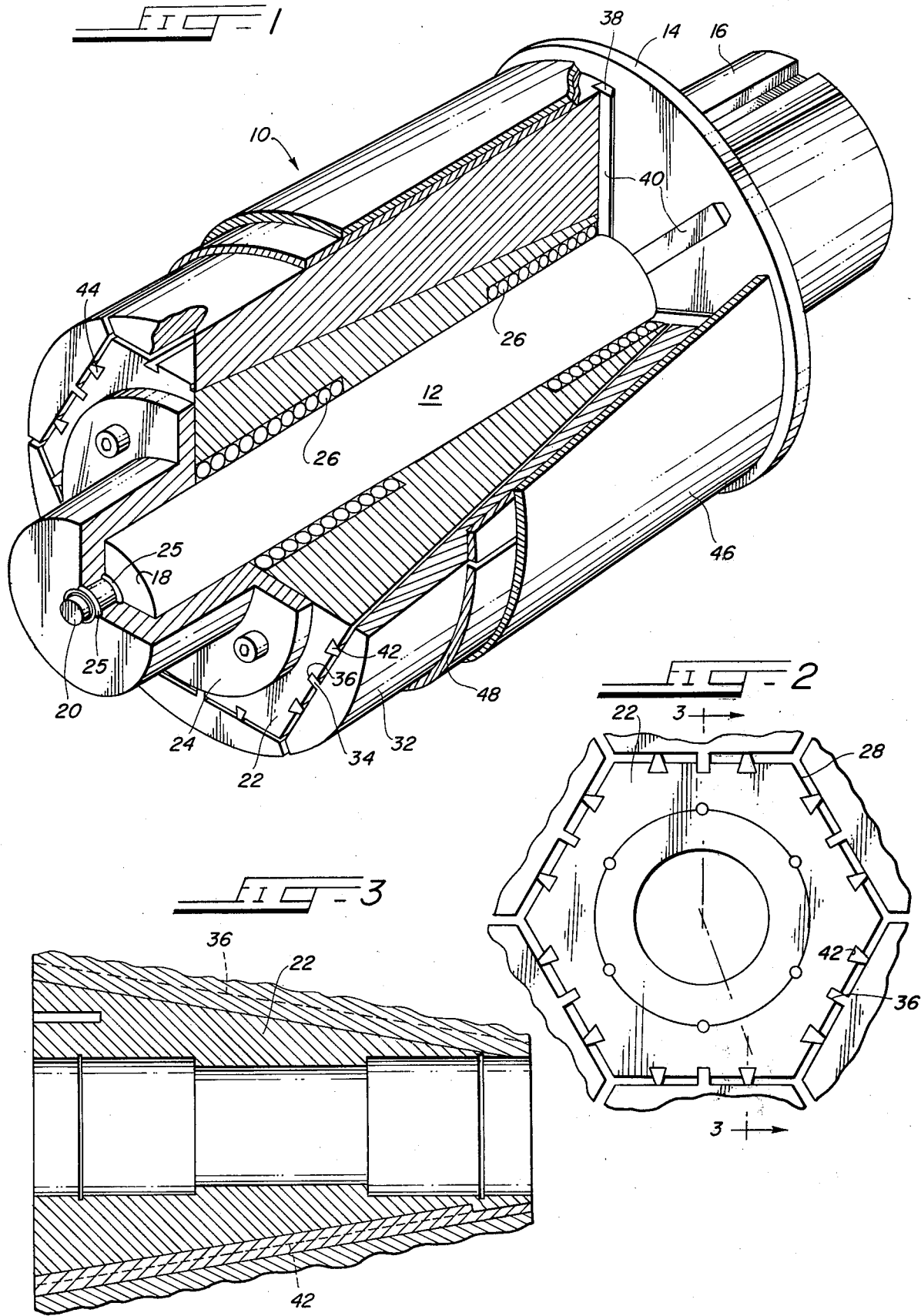

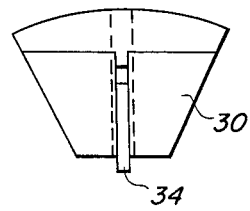
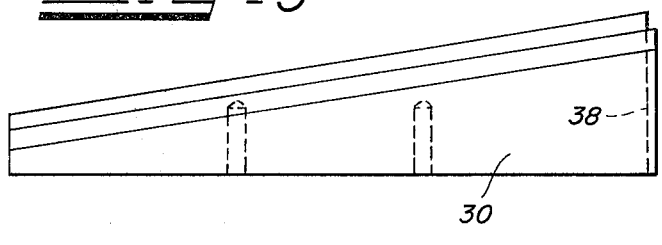
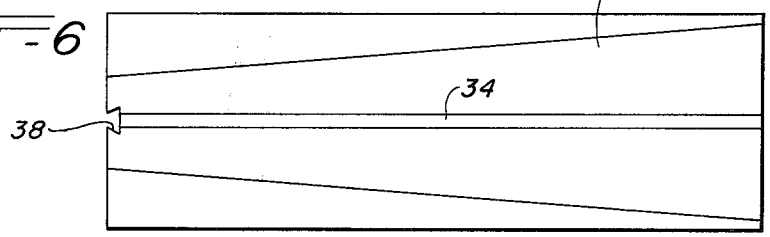
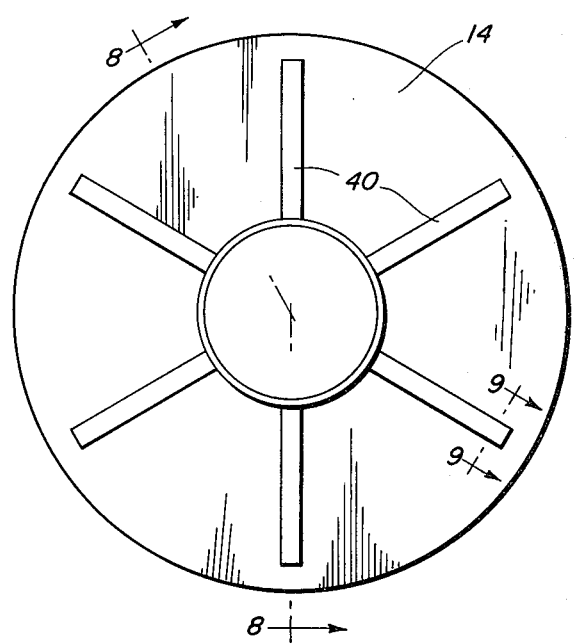
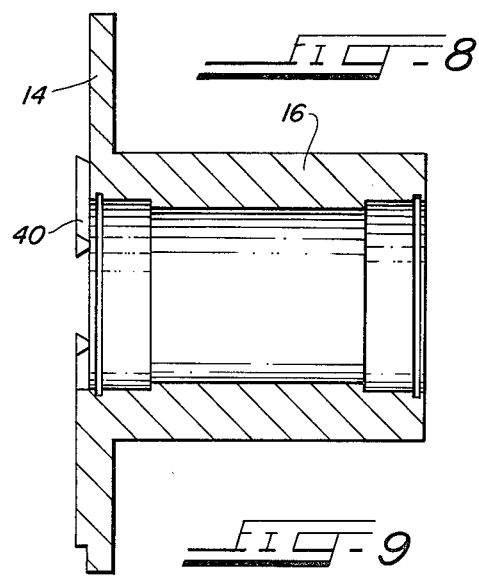
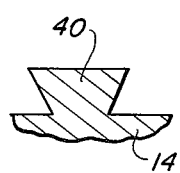
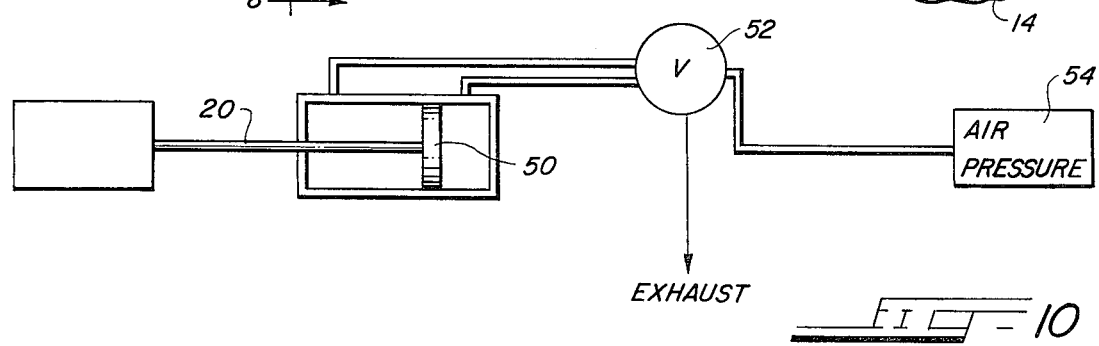

EXPANSIBLE MANDREL

BACKGROUND OF THE INVENTION

Expansible mandrels and other similar connecting devices are known in the prior art. Some are generally cylindrical in shape, others are generally conical in shape.

In U.S. Pat. No. 3,576,336 to Uhlig, a force transmitting device is disclosed which includes a conical body section movable relative to a plurality of segmented wedge members arranged around the body section, the wedge members being so arranged to exert a retaining force on a cylindrical part to be retained within another cylindrical part. The wedge members presented a truncated conical external surface and are thus tapered externally as well internally.

Spahn, U.S. Pat. No. 2,601,419 teaches the use of a pair of spaced frusto-pyramidal members, each of which is received in an opposite end of plurality of segmented members, so that upon movement of the frusto-pyramidal members toward one another, the segmented members expand radially. Resilient means surrounding the segmented member retain them in assembled relationship.

THE INVENTION

An expansible mandrel constructed according to this invention comprises a generally truncated polyhedron-shaped core member which is rotatable about and axially movable relative to a support, and a plurality of wedge members, each having an inner surface which engages an outer surface of the core member. The core member and the wedge members together define an outer generally cylindrical surface. The wedge members are axially fixed but radially movable with respect to the support, the radial movement being caused by axial movement of the core member. The wedge members are rotatable with and radially movable with respect to a backing member, the wedge members and the backing member are rotatable about the support. Dovetail keys on the backing plate projecting into suitable keyways in the wedge members provides the connection and permits the radial movement. An elastic member surrounds the wedge means to maintain them in position. Each wedge means is keyed to its associated core surface to maintain the parts in proper position relative to one another, and low friction strips are embedded in suitable keyways in the core member to provide ease of axial movement of the wedge members.

Suitable pneumatic means can be used to operate the mandrel, connection thereto being made, for example, by an axially movable operating rod passing through the support and being connected to the core means.

THE DRAWINGS

FIG. 1 is a perspective view of an expansible mandrel in its expanded condition constructed according to this invention with parts broken away to show details;

FIG. 2 is an end view of the core member of the mandrel;

FIG. 3 is a longitudinal sectional view taken on line 3—3 of FIG. 2;

FIG. 4 is an end view of a wedge member of the mandrel;

FIG. 5 is a side view of the wedge member of FIG. 4;

FIG. 6 is a bottom view of the wedge member of FIG. 4; FIG. 7 is an elevation view of the end plate of the mandrel;

FIG. 8 is a longitudinal sectional view taken on line 8—8 of FIG. 7;

FIG. 9 is an enlarged sectional view taken on line 9—9 of FIG. 7; and

FIG. 10 is a pneumatic circuit for operating the mandrel of FIG. 1.

DETAILED DESCRIPTION

Referring to FIG. 1 of the drawing, the expansible mandrel, identified as 10, includes a support (in this case, a shaft) 12, non-rotatable about its major axis, and a back plate 14 having a hub or the like 16 surrounding at least a part of the shaft and adapted to be connected to rotatable means, not shown. The support has a central opening 18 through which an operating rod 20 passes. Surrounding the shaft 12 is a generally truncated polyhedron-shaped core member 22. The core member 22 is connected to the operating rod by means of a cover 24 which is bolted to the core member. Snap rings 25 provide the connection of the cover 24 to the operating rod 20 and permit the cover 24 to rotate with the core member 22. Suitable bearings 26 (the details of which are not illustrated because any suitable well known bearing construction may be used) are interposed between the core member 22 and the shaft 12 to permit the axial and rotational movement of the core member 22 relative to the shaft 12.

The core member 22 has a plurality of tapered, planar surfaces 28, each of which is associated with a wedge member 30. When assembled, as shown, the wedge members 30 present, in concert, a generally cylindrical surface 32. Each wedge member 30 is constructed with a longitudinal key 34 received in a keyway 36 in the core member 22, and, also, is constructed with a radial keyway 38 of dovetail section which receives a radial dovetail key 40 on the back plate 14. These keys and keyways 40 and 38, respectively, permit the wedge member 30 to move radially with respect to the back plate 14. The keys and keyways 36 and 38 insure the location of each wedge member 30 relative to its associated surface 28. The core member 22 also has longitudinal dovetail-shaped slots 42 receiving low friction material 44 to allow ease of relative movement between the wedge members 30 and the core member 22.

An elastic member 46 surrounds the assembly 10 to retain the parts in their assembled relationship. In order to vary the diameter of the mandrel, spacer plates 48 may be used between the wedge members 30 and the elastic member 46. The core member 22, the wedge members 30 and the spacer plates 48 may be constructed of suitable metal; aluminum may be used because of its density.

A simple pneumatic circuit may be used to control the mandrel; one example of such circuit is illustrated in FIG. 10, and comprises a double acting piston 50 connected at one side to the operating rod 20 and to the other side to a suitable valve 52 for controlling the flow of air from a source 54. By using the valve 50, it is simple to choose the proper flow of air to the mandrel 10 in order to expand or contract the same. In addition, suitable control means may be required to operate whatever drive means may be connected to the hub or the like 16; generally such as electrical circuitry.

In use, an object or work piece is slipped over the open end of the mandrel; the core member is then drawn into the wedge members by operating rod 20, so that the mandrel grips the interior of the work piece. The mandrel may be rotating during use. In the event that the expanded diameter of the mandrel is not matched to the inner diameter of the work piece, suitable spacer plates may be added.

We claim:

1. An expansible mandrel assembly which comprises:

a support;

a generally truncated polyhedron-shaped core member movable axially of said support;

said core member having a plurality of generally planar outer surfaces;

a plurality of wedge members each having an inner surface which engages an outer surface of said core member and an outer arcuate surface;

said plurality of wedge members when in concert defining an outer, generally cylindrical surface;

said wedge members each being axially fixed and radially movable with respect to said support;

elastic means surrounding said wedge member maintaining said wedge members in position relative to said core and providing a generally cylindrical outer surface; and means to axially move said core member relative to said support and to said wedge members whereby to vary the outer dimension of said assembly.

2. An expansible mandrel assembly as recited in claim 1, further comprising a back plate having a plurality of radially arranged dovetail keys, and said wedge members each having at least one radially oriented dovetail keyway in one terminal end in which a key is received.

3. An expansible mandrel assembly as recited in claim 2, further comprising axial keyways in said core member intersecting said outer surfaces and keys extending from said wedge members received in said keyways.

4. An expansible mandrel assembly as recited in claim 2 further comprising low-friction elements carried by said core member at its outer surfaces on which said inner surfaces of said wedge members move axially relative to said core member outer surfaces.

5. An expansible mandrel as recited in claim 1, wherein said means to axially move said core member comprises rod means connected to said core member and movable axially relative to said support.

* * * * *